(12) United States Patent
Bakhsh et al.

(10) Patent No.: US 10,807,721 B2
(45) Date of Patent: Oct. 20, 2020

(54) INTEGRATED SAFETY SEAT FOR INFANTS AND SMALL CHILDREN

(71) Applicant: Aerodynamic Composites, LLC, Pooler, GA (US)

(72) Inventors: Muneer Bakhsh, Pooler, GA (US); Charles Aitken, Pooler, GA (US)

(73) Assignee: AERODYNAMIC COMPOSITES, LLC, Pooler, GA (US)

( * ) Notice: Subject to any disclaimer, the term of this patent is extended or adjusted under 35 U.S.C. 154(b) by 38 days.

(21) Appl. No.: 16/174,242

(22) Filed: Oct. 29, 2018

(65) Prior Publication Data
US 2020/0130848 A1 Apr. 30, 2020

(51) Int. Cl.
| | |
|---|---|
| *B60N 2/20* | (2006.01) |
| *B64D 11/06* | (2006.01) |
| *B60N 2/26* | (2006.01) |
| *B60N 2/30* | (2006.01) |
| *B60N 2/22* | (2006.01) |
| *B60N 2/005* | (2006.01) |

(52) U.S. Cl.
CPC .......... *B64D 11/0698* (2014.12); *B60N 2/005* (2013.01); *B60N 2/20* (2013.01); *B60N 2/22* (2013.01); *B60N 2/265* (2013.01); *B60N 2/3009* (2013.01); *B60N 2/3045* (2013.01); *B64D 11/062* (2014.12); *B64D 11/064* (2014.12); *B60N 2/3047* (2013.01); *B64D 11/06* (2013.01); *B64D 11/0691* (2014.12)

(58) Field of Classification Search
CPC . B64D 11/0698; B64D 11/062; B64D 11/064; B64D 11/06; B64D 11/0691; B60N 2/005; B60N 2/3009; B60N 2/3045; B60N 2/3047

USPC .......................................................... 297/14
See application file for complete search history.

(56) References Cited

U.S. PATENT DOCUMENTS

| | | | | |
|---|---|---|---|---|
| 3,594,037 | A * | 7/1971 | Sherman ................ | A47C 1/036 297/14 |
| 5,310,242 | A * | 5/1994 | Golder .................... | A47D 1/10 297/14 |
| 10,293,944 | B2 * | 5/2019 | Spagl .................... | B64D 11/064 |
| 2015/0375644 | A1 * | 12/2015 | Gratz .................... | B60N 2/309 297/316 |

OTHER PUBLICATIONS

Bakhsh, Muneer, "Feasibility Study of an Integrated Safety Seat for Infants and Children Under the Age of Two Traveling in Commercial Aircraft" (1999). Published Nov. 1, 1999 by Embry-Riddle Aeronautical University—Daytona Beach, Florida, USA, available at commons.erau.edu/db-theses/299.

* cited by examiner

*Primary Examiner* — Syed A Islam
(74) *Attorney, Agent, or Firm* — Hassan Abbas Shakir; Shakir Law PLLC

(57) ABSTRACT

A safety seat for an occupant includes a front shell secured to a bulkhead. The front shell has an outer edge and an inner edge. The inner edge defines an opening. The safety seat includes a seat base having a first side and a second side opposite the first side. The seat base has a first position and a second position. In the first position, the first side is flush with the inner edge and in the second position; the second side supports the occupant.

19 Claims, 11 Drawing Sheets

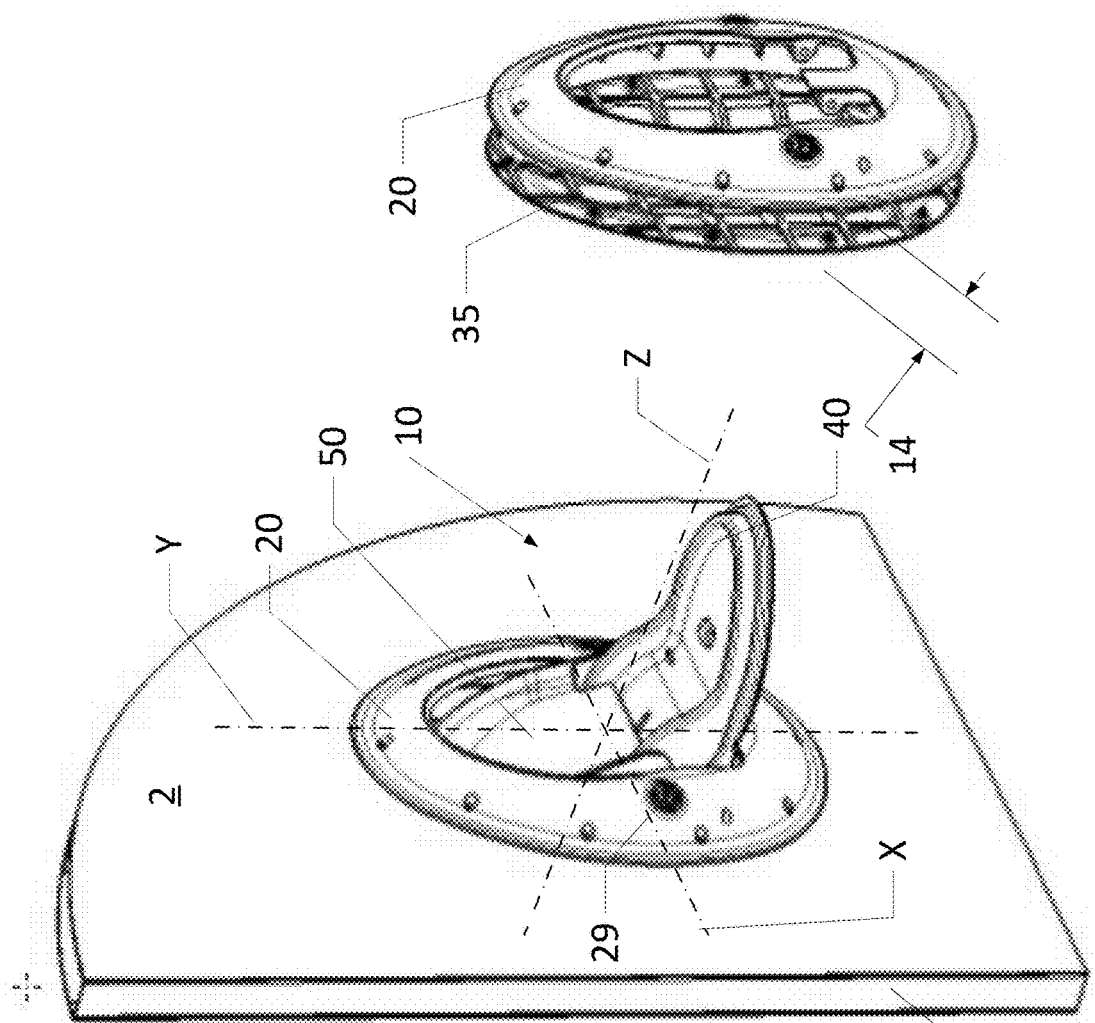
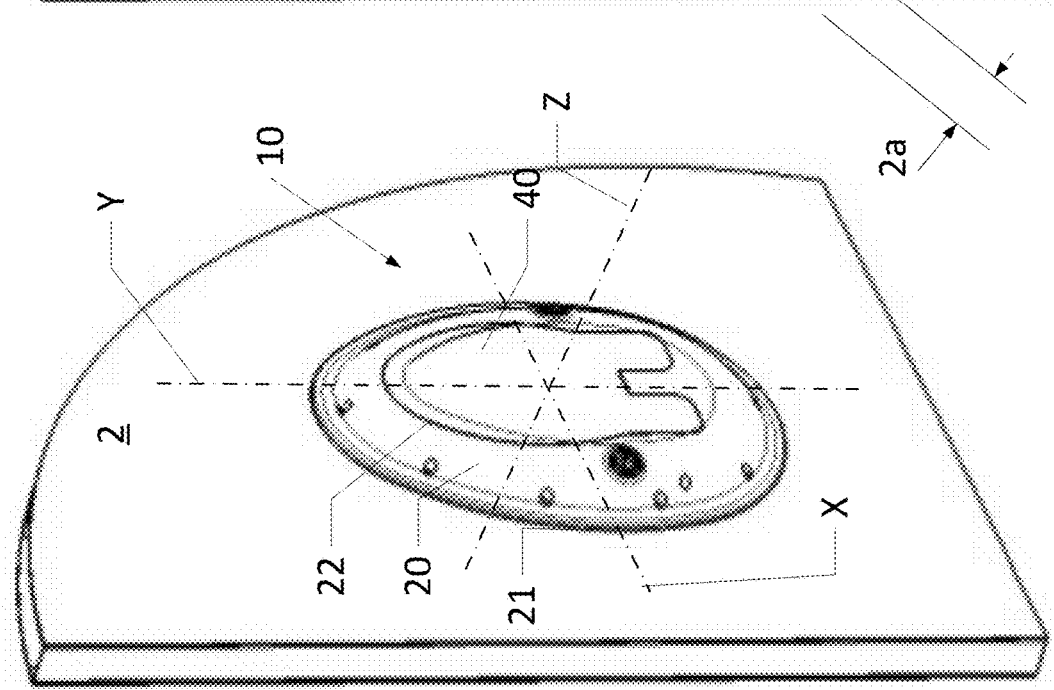

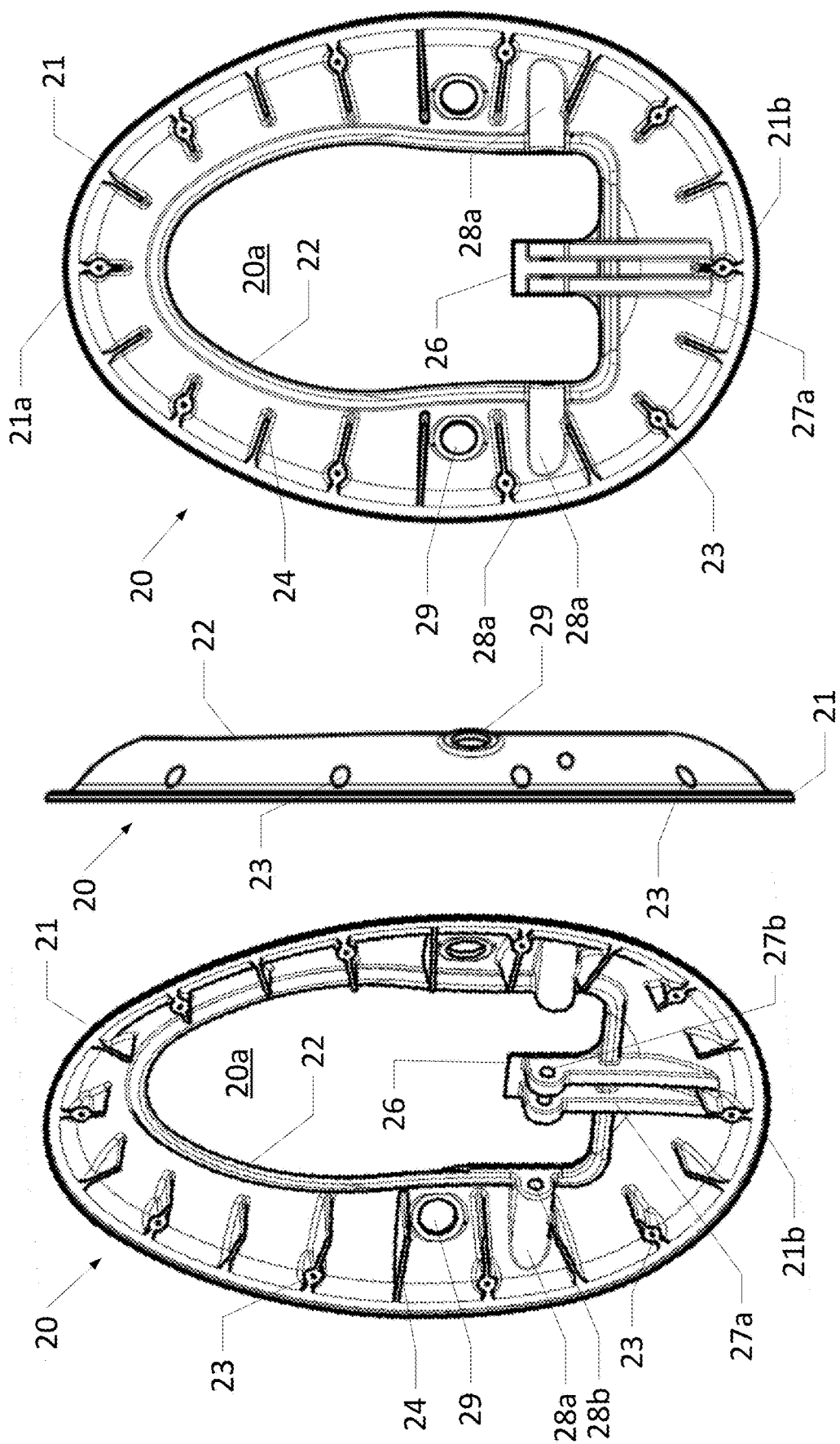

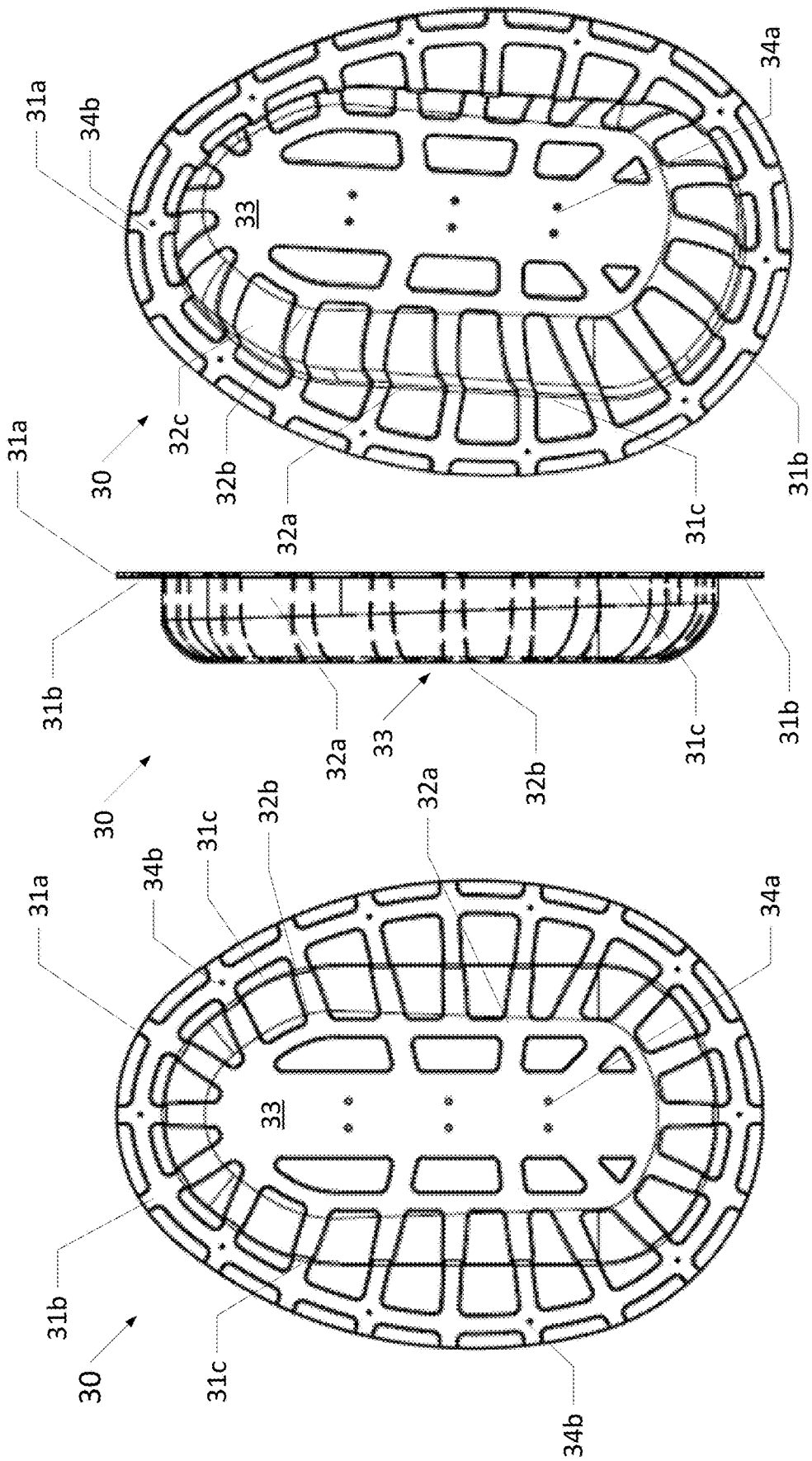

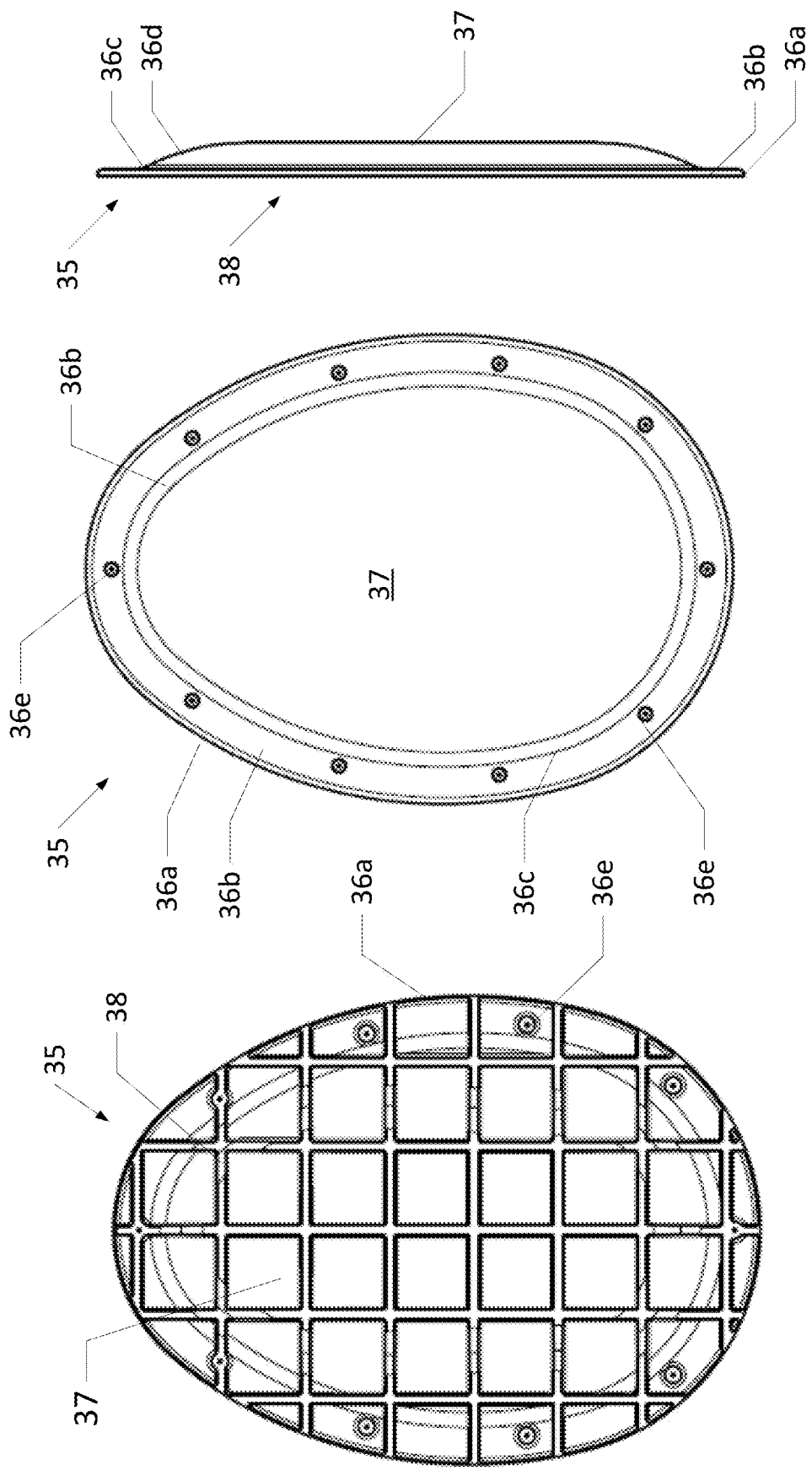

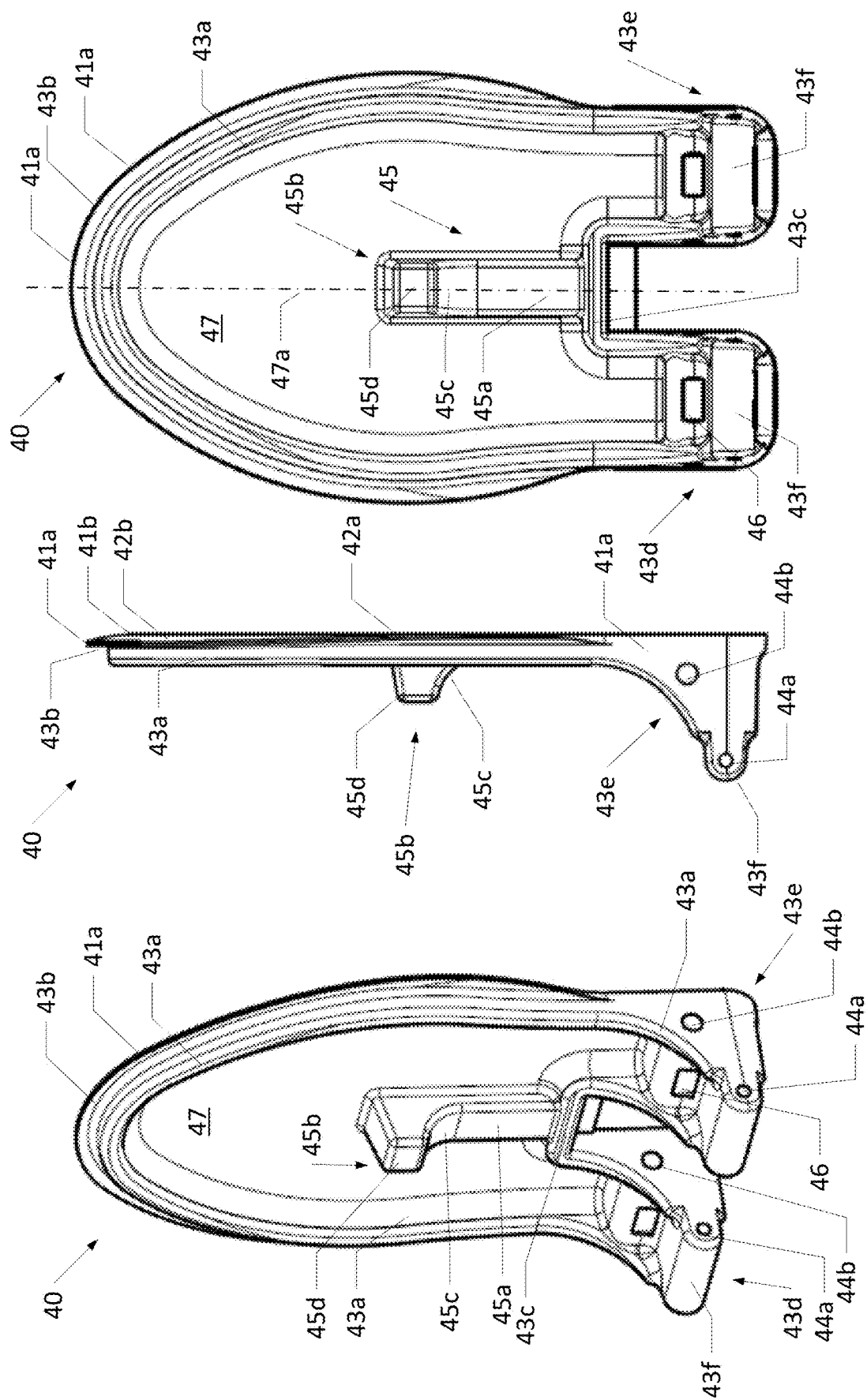

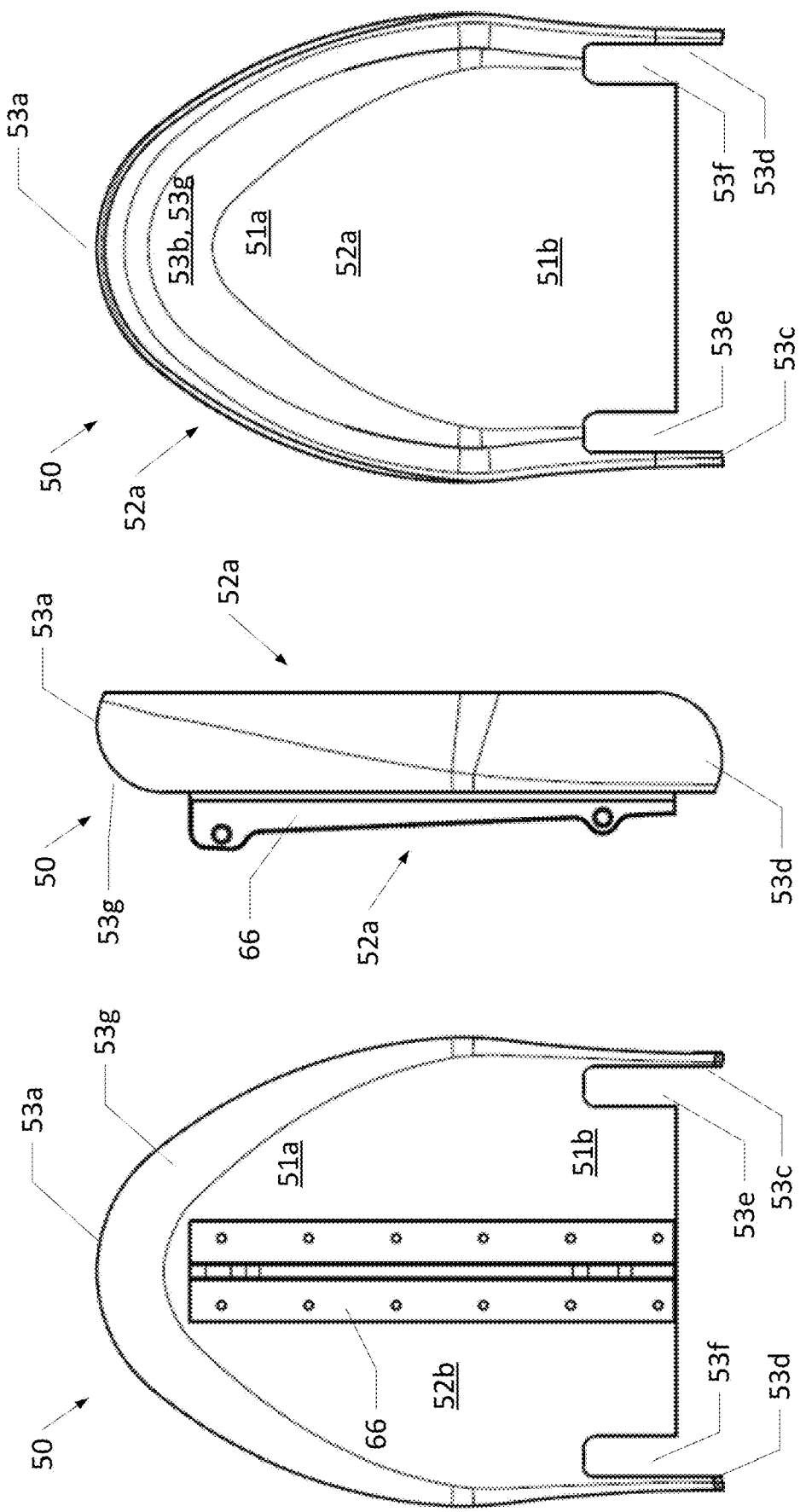

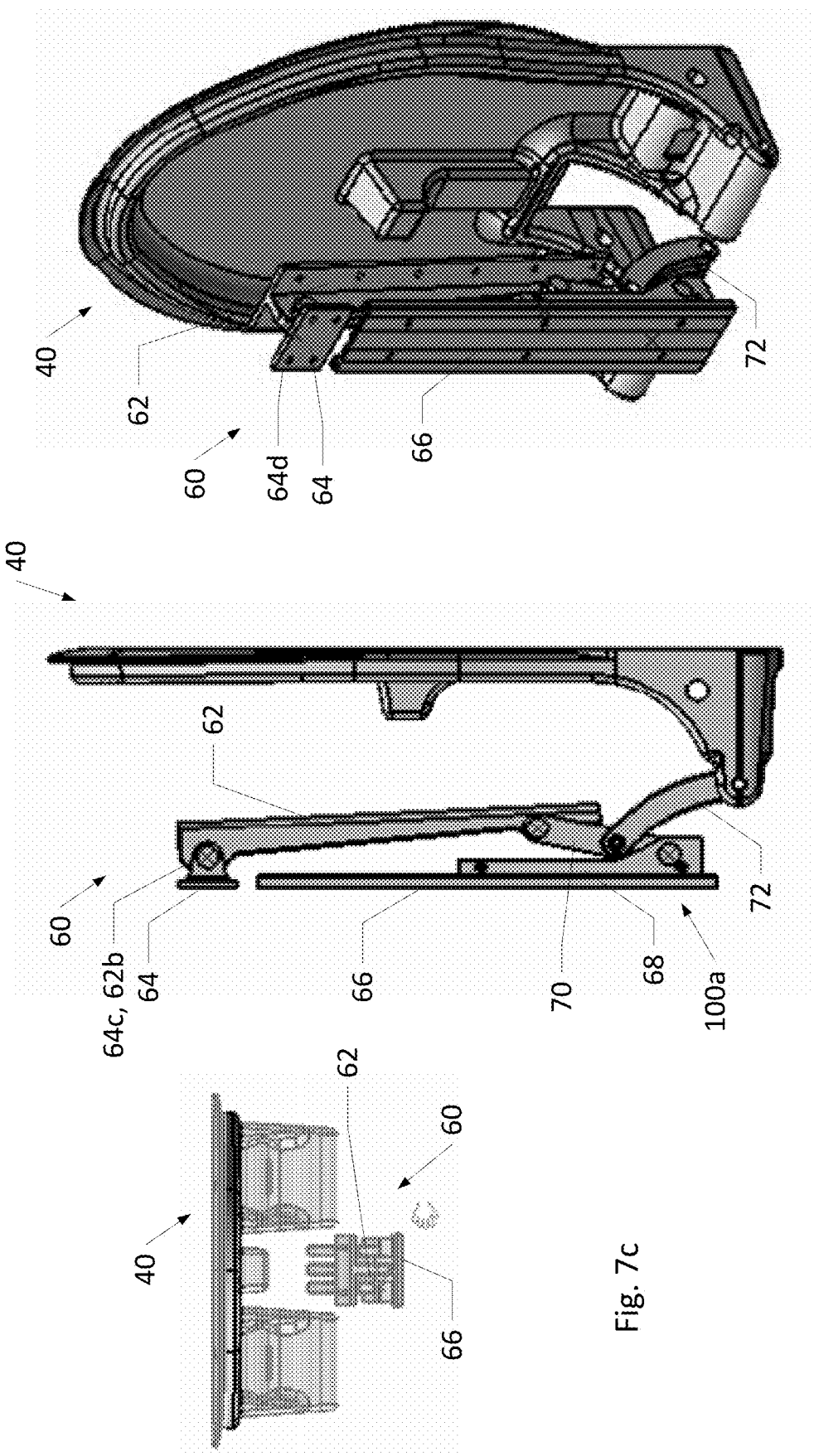

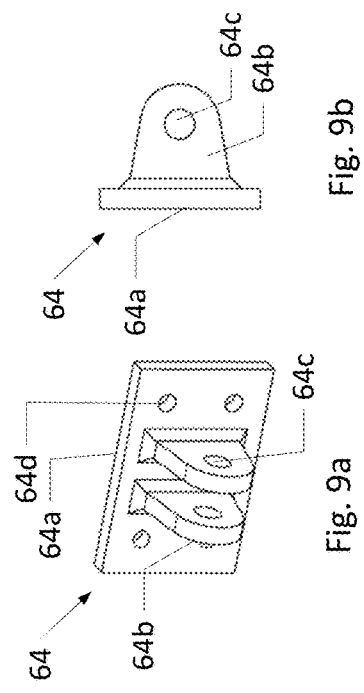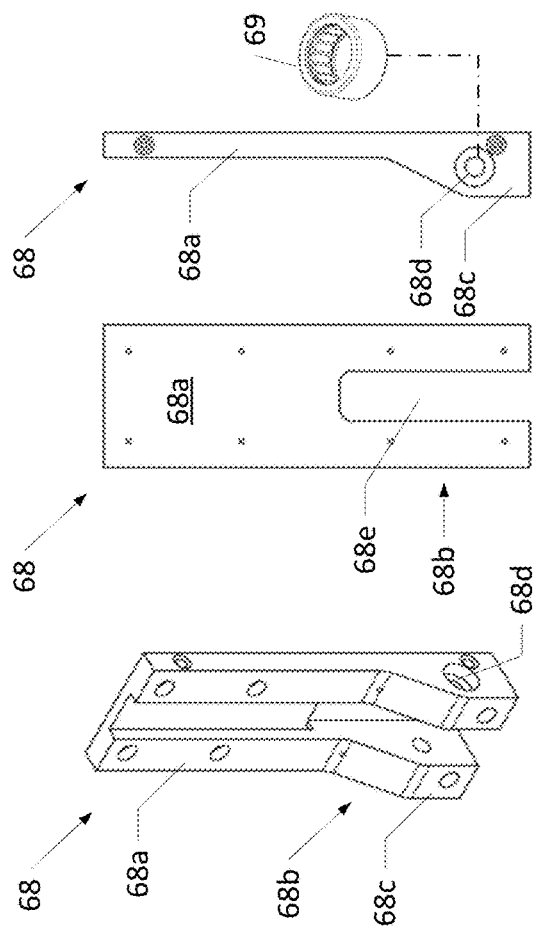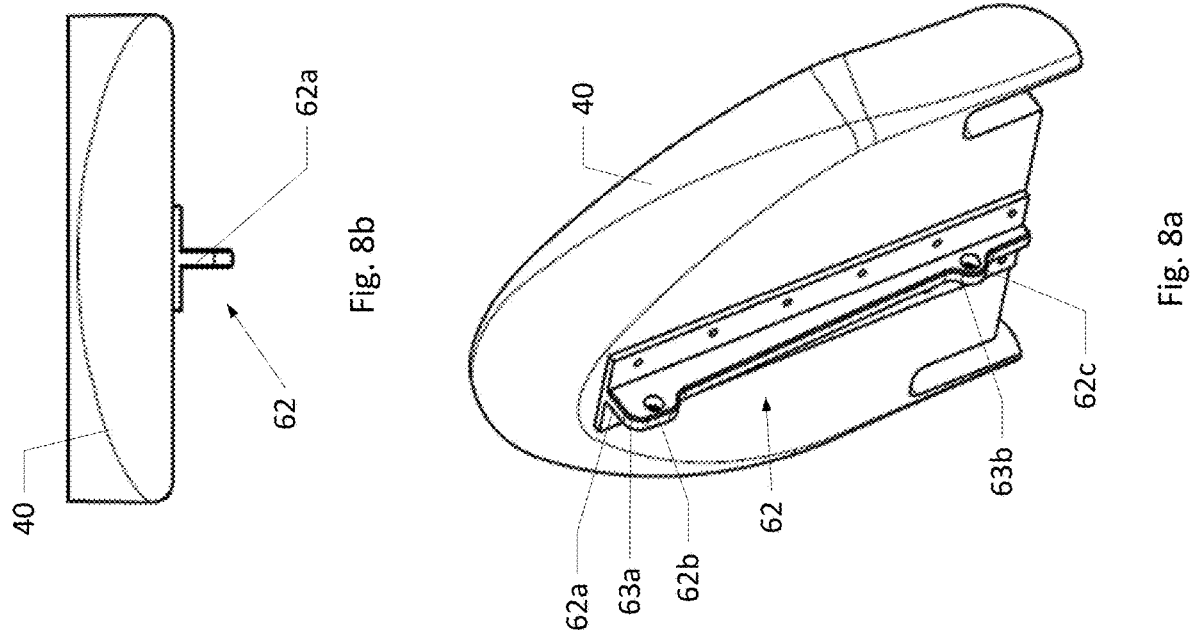

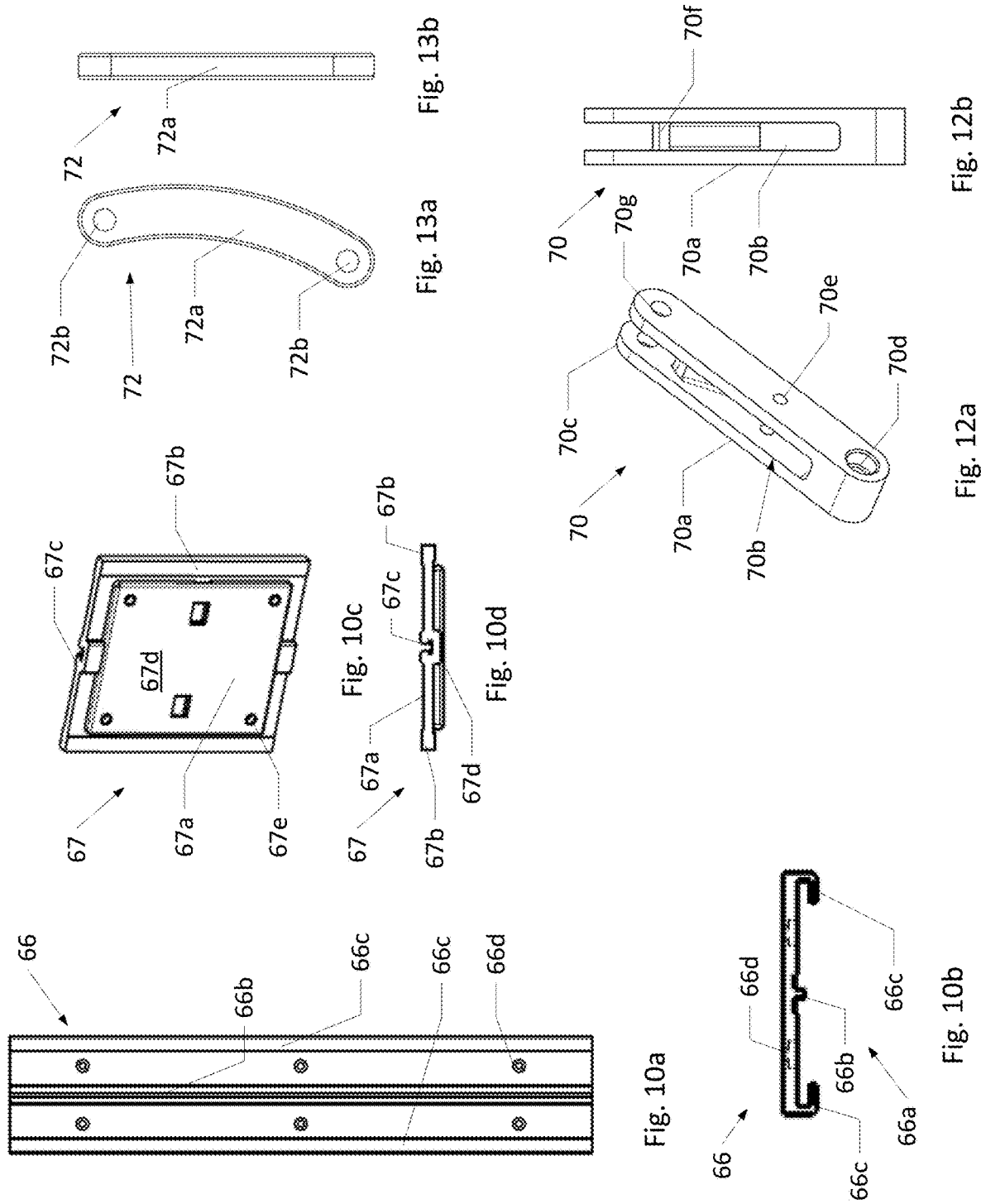

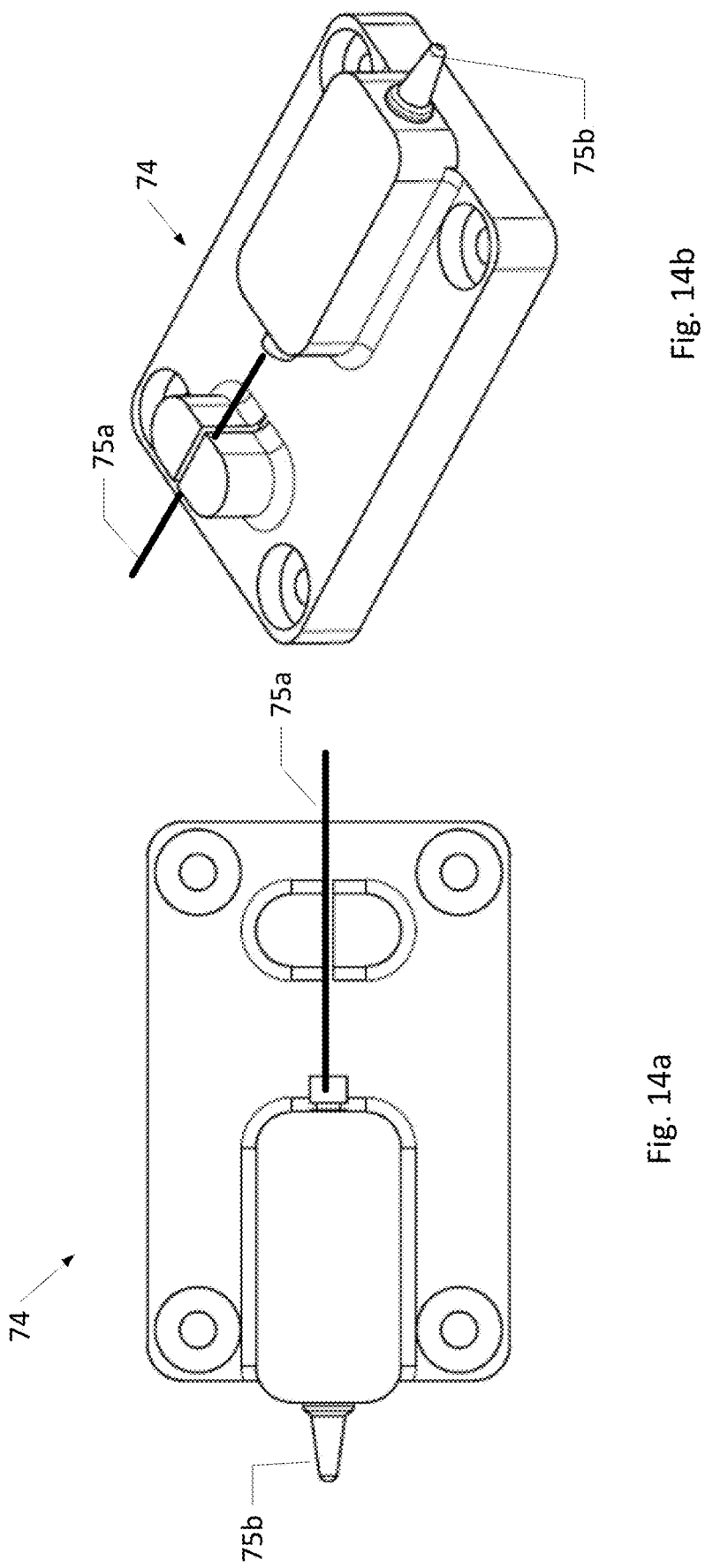

INTEGRATED SAFETY SEAT FOR INFANTS AND SMALL CHILDREN

BACKGROUND OF THE INVENTION

1. Field of the Invention

The present invention relates to safety seats for infants and children in public or private conveyances. In particular, the present invention relates to safety seats for infants and children in public or private conveyances having bulkheads and the safety seat integrated into the bulkhead to remain part of the conveyance. The present invention also relates to safety seats for infants and children that are non-obtrusive in the conveyance when not used.

2. Discussion of the Related Art

When traveling on private or public conveyances with infants and small children, a caregiver may, at the discretion of the operator of the conveyance, hold an infant and small child in the caregiver's lap for the duration of the travel. Unfortunately, doing so leaves lap children at risk of injury if the infant or child is propelled forward in an accident. Holding a lap child is also strenuous for a caregiver.

At their discretion most operators of public conveyances, especially air carriers, end the practice of lap children at age 2 of the child and require the purchase of a separate seat. However, seats are typically designed for adults and are ill-fitting for children. Thus, caregivers typically bring a car seat on-board and secure the car seat to the seat of the conveyance and, in turn, secure the child in the car seat.

However, car seats are bulky and cumbersome to bring onto an aircraft or to bring on a vacation or other end destination.

Thus, what is needed is a safety seat that is integrated into a portion of the conveyance and that is non-obtrusive in the conveyance when not used.

SUMMARY OF THE INVENTION

A safety seat for an occupant includes a front shell secured to a bulkhead. The front shell has an outer edge and an inner edge. The inner edge defines an opening. The safety seat includes a seat base having a first side and a second side opposite the first side. The seat base has a first position and a second position. In the first position, the first side is flush with the inner edge and in the second position; the second side supports the occupant.

BRIEF DESCRIPTION OF THE INVENTION

The details of the invention may be appreciated in accordance with one or more embodiments of the present invention illustrated in the following drawings:

FIG. 1a is perspective view of a safety seat in a closed position and integrated in a bulkhead in accordance with one or more embodiments of the present invention.

FIG. 1b is perspective view of the safety seat of FIG. 1a in an open position in accordance with one or more embodiments of the present invention.

FIG. 1c is a perspective view of a front shell and a back shell of the safety seat of FIGS. 1a and 1b with the bulkhead, a seat base, and a seat back removed.

FIG. 2a is a perspective rear view of a front shell of the safety seat in accordance with one or more embodiments of the present invention.

FIG. 2b is a rear planar view of a front shell of the safety seat in accordance with one or more embodiments of the present invention.

FIG. 2c is a side view of a front shell of the safety seat in accordance with one or more embodiments of the present invention.

FIG. 3a is a perspective rear view of a back shell of the safety seat in accordance with one or more embodiments of the present invention.

FIG. 3b is a planar front view of a back shell of the safety seat in accordance with one or more embodiments of the present invention.

FIG. 3c is a side view of a back shell of the safety seat in accordance with one or more embodiments of the present invention.

FIG. 4a is a planar rear view of a rear cover of the safety seat in accordance with one or more embodiments of the present invention.

FIG. 4b is a planar front view of a rear cover of the safety seat in accordance with one or more embodiments of the present invention.

FIG. 4c is a side view of a rear cover of the safety seat in accordance with one or more embodiments of the present invention.

FIG. 5a is a perspective rear view of a back shell of the safety seat in accordance with one or more embodiments of the present invention.

FIG. 5b is a planar rear view of a back shell of the safety seat in accordance with one or more embodiments of the present invention.

FIG. 5c is a side view of a back shell of the safety seat in accordance with one or more embodiments of the present invention.

FIG. 6a is a rear view of a seat back and a spine mounted to the seat back of the safety seat in accordance with one or more embodiments of the present invention.

FIG. 6b is a front view of a seat back of the safety seat in accordance with one or more embodiments of the present invention.

FIG. 6c is a side view of a seat back and a spine mounted to the seat back of the safety seat in accordance with one or more embodiments of the present invention.

FIG. 7a is a rear perspective view of a seat base and actuator assembly of the safety seat in accordance with one or more embodiments of the present invention.

FIG. 7b is a side view of a seat base and actuator assembly of the safety seat in accordance with one or more embodiments of the present invention.

FIG. 7c is a top view of a seat base and actuator assembly the seat back of the safety seat in accordance with one or more embodiments of the present invention.

FIG. 8a is a perspective view of a spine mounted to a seat back of the safety seat in accordance with one or more embodiments of the present invention.

FIG. 8b is a top view of a spine mounted to a seat back of the safety seat in accordance with one or more embodiments of the present invention.

FIG. 9a is a perspective view of an anchor hinge of the safety seat in accordance with one or more embodiments of the present invention.

FIG. 9b is a side view of an anchor hinge of the safety seat in accordance with one or more embodiments of the present invention.

Figure 1D:
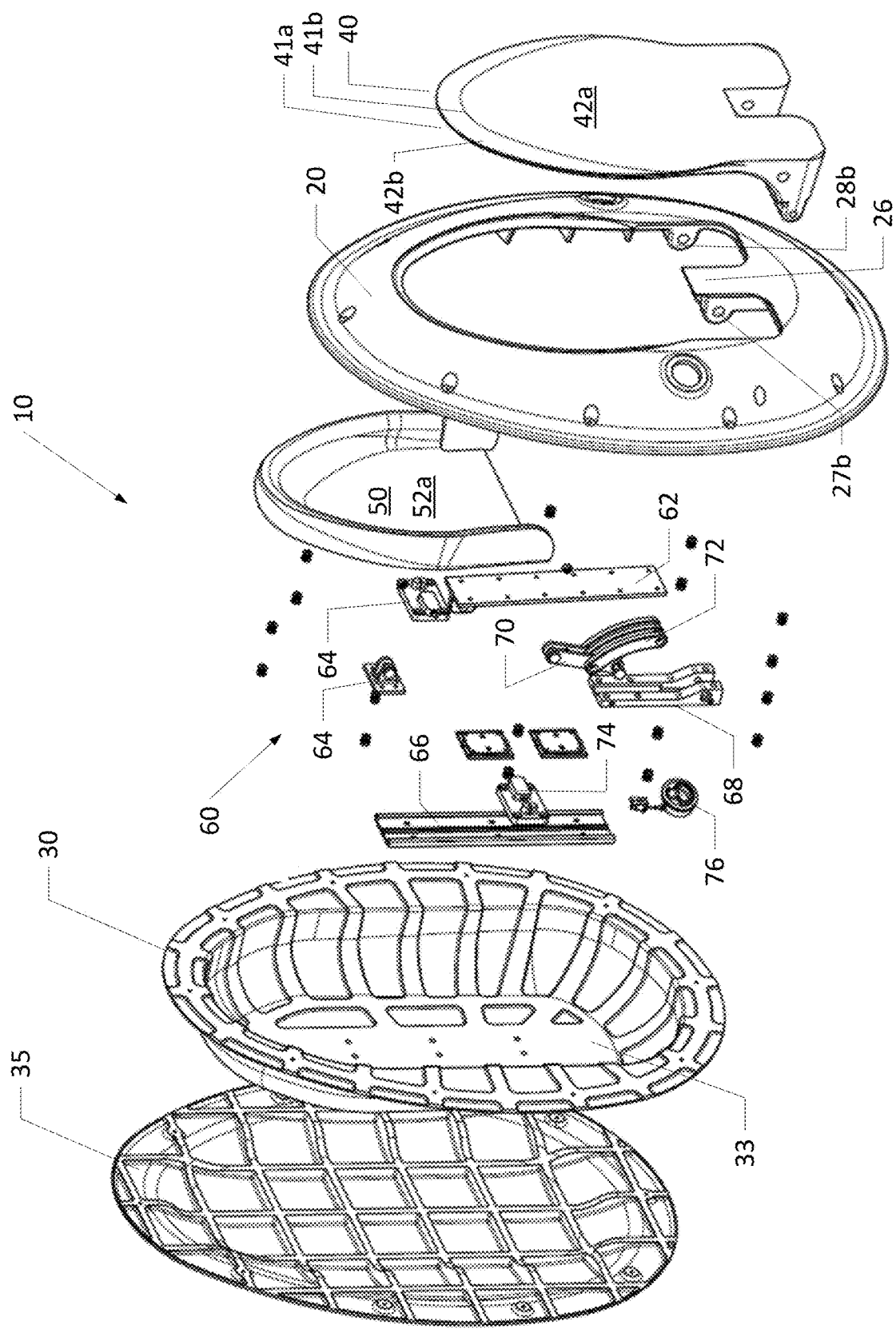
FIG. 1d is an exploded view of a safety seat in a closed position in accordance with one or more embodiments of the present invention.

FIG. 10*a* is a front view of a slide of the safety seat in accordance with one or more embodiments of the present invention.

FIG. 10*b* is a top view (at an exaggerated scale relative to FIG. 10*a*) of a slide of the safety seat in accordance with one or more embodiments of the present invention.

FIG. 10*c* is a perspective view of a shoe of the safety seat in accordance with one or more embodiments of the present invention.

FIG. 10*d* is a top view of a shoe of the safety seat in accordance with one or more embodiments of the present invention.

FIG. 11*a* is a perspective view of a carriage of the safety seat in accordance with one or more embodiments of the present invention.

FIG. 11*b* is a rear view of a carriage of the safety seat in accordance with one or more embodiments of the present invention.

FIG. 11*c* is a side view of a carriage of the safety seat in accordance with one or more embodiments of the present invention.

FIG. 12*a* is a perspective view of a control arm of the safety seat in accordance with one or more embodiments of the present invention.

FIG. 12*b* is a rear view of a control arm of the safety seat in accordance with one or more embodiments of the present invention.

FIG. 13*a* is a side view of a link of the safety seat in accordance with one or more embodiments of the present invention.

FIG. 13*b* is a front view of a link of the safety seat in accordance with one or more embodiments of the present invention.

FIG. 14*a* is a planar view of an initiator of the safety seat in accordance with one or more embodiments of the present invention.

FIG. 14*b* is a perspective view of an initiator of the safety seat in accordance with one or more embodiments of the present invention.

DETAILED DESCRIPTION OF THE INVENTION

The following detailed description is of the best mode or modes of the invention presently contemplated. Such description is not intended to be understood in a limiting sense, but to be an example of the invention presented solely for illustration thereof, and by reference to which in connection with the following description and the accompanying drawings one skilled in the art may be advised of the advantages and construction of the invention. In the various views of the drawings, like reference characters designate like or similar parts.

Definitions

All technical and scientific terms shall have the same meaning as commonly understood by one of ordinary skill in the art. Nonetheless, the following terms are defined below to aid in the understanding of the disclosure and the definitions apply to all parts of speech of the term regardless whether the term is defined explicitly as such.

Accordingly, the meaning of specific terms or words used in the specification and the claims should not be limited to the literal or commonly employed sense, but should be construed in accordance with the spirit and scope of the disclosure. The definitions of these terms therefore may be determined based on the contents throughout the specification. Where not defined, the meaning of all terms will be clear from the context of the description.

Like numbers refer to like elements throughout, and explanations that duplicate one another will be omitted.

"A" and "an" preceding an element or component are intended to be nonrestrictive regarding the number of instances (i.e. occurrences) of the element or component. Therefore, "a" or "an" should be read to include one or at least one, and the singular word form of the element or component also includes the plural unless the number is obviously meant to be singular.

"About," "approximately," or "substantially similar" refer to one or more industry-accepted tolerances for the corresponding term and/or relativity between elements. Where such industry-accepted tolerances for the corresponding term are unknown, difficult to determine, inconsistent, or subject to experimentation, "about," "approximately," or "substantially similar" refer to a 10% variation from the nominal value. Even if not explicitly stated, it is to be understood that a variation is always included in a given value, whether or not the variation is specifically referenced. In accordance with one or more embodiments of the present invention, "about," "approximately," or "substantially similar" mean within 5% of the reported numerical value. In accordance with one or more embodiments of the present invention, "about," "approximately," or "substantially similar" mean within 10, 9, 8, 7, 6, 5, 4, 3, 2, or 1% of the reported numerical value.

"Aircraft" means a device that is used or intended to be used for flight in the air, and encompasses an airplane or helicopter.

"Airframe" means inter alia the fuselage, booms, nacelles, cowlings, fairings, airfoil surfaces (including rotors but excluding propellers and rotating airfoils of engines), and landing gear of an aircraft and their accessories and controls.

"Airplane" means an engine-driven fixed-wing aircraft heavier than air, which is supported in flight by the dynamic reaction of the air against its wings.

"Comprises," "comprising," "includes," "including," "has," "having," "contains," or "containing," or any other variation thereof are used to describe and claim a non-exclusive inclusion such that a composition, a mixture, process, method, article, or apparatus that comprises a list of elements is not necessarily limited to only those elements but can include other elements not expressly listed or inherent to such composition, mixture, process, method, article, or apparatus.

"Comprises," "comprising," "includes," "including," "has," "having," "contains," or "containing," or any other variation thereof may also be understood to mean "including, but not limited to."

"Connector," "fastener," or "fastening device" shall in the singular and plural refer to any device used for mechanically joining two or more parts, components, or the like together for its intended purpose whether temporary or permanent, including a screw, nail, anchors, clamp, cotter pin, retainer, clip, or any other device known or yet to be developed. "Connector," "fastener," or "fastening device" shall in the singular and plural also refer to an adhesive, cement, glue, or the like. Where a specific embodiment of a "connector," "fastener," or "fastening device" is disclosed it shall be understood to be the preferred embodiment of a "connector," "fastener," or "fastening device" for reasons of economy, structural integrity, longevity and/or ease of installation.

"Component" shall in the singular and plural refer to one or more parts, elements, pieces, or other items related to the safety seat of the present invention.

"Invention" or "present invention" are non-limiting terms and not intended to refer to any single aspect of the particular invention but encompass all possible aspects as described in the specification and the claims.

"Mounted", "mounted in," or "integrated" shall mean that a first element is directly secured to or in a second element or have intervening elements be present between the first and second element. "Directly mounted" or "directly mounted in" shall mean that no intervening element is present between the first and second element and that the first element is in contact with the second element.

"On," "over," "disposed on," "disposed against," and/or "disposed over," shall mean that a first element can be directly located on a second element or have intervening elements be present between the first and second element. "Directly on," "directly over," "directly against," directly disposed against," "directly disposed on," and/or "directly disposed over" shall mean that no intervening element is present between the first and second element and that the first element is in contact with the second element.

"One embodiment," "an embodiment," "exemplary embodiment," or variations thereof means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with others of the embodiments.

"Child," "children," "small child," "small children," and "infant" in the singular and the plural refer to an occupant of the safety seat of the present invention and who is 2 years of age or younger, is less than 40 lbs.

"Infant" in the singular and the plural refers to an occupant of the safety seat of the present invention who is unable to remain seated without assistance.

"User" in the singular and the plural refers to a person, entity, and/or other group uses one or more aspects of the present invention. By way of example but not limitation, a user may be a parent of an infant or small child who is an occupant of the safety seat of the present invention or the air carrier utilizing the safety seat of the present invention.

General Construction and Material Selection

In accordance with one or more embodiments of the present invention, a safety seat is used for safely transporting infants and small children in a conveyance having a bulkhead. A bulkhead is an upright dividing wall inside the body of the conveyance and separates one or more compartments in the conveyance from another compartment in the conveyance. For example, a bulkhead may separate different passenger sections from one another or galleys and/or bathrooms from a passenger section. Passenger seats are typically spaced, for a variety of reasons, a greater distance from bulkheads than from proceeding or succeeding rows of passenger seats.

The present invention is, for reasons of simplicity and clarity described using the example of an aircraft, especially an airplane operated by a commercial air carrier. However, the present invention may be used in any conveyance now known or yet to be developed. A conveyance may be, by way of example but not limitation, a ship, bus, train car, subway car, or tram car.

FIG. 1a is perspective view of a safety seat in a closed position and integrated in a bulkhead in accordance with one or more embodiments of the present invention.

FIG. 1b is perspective view of the safety seat of FIG. 1a in an open position in accordance with one or more embodiments of the present invention.

FIG. 1c is a perspective view of a front shell and a back shell of the safety seat of FIGS. 1a and 1b with the bulkhead, a seat base, and a seat back removed.

FIG. 1d is an exploded view of a safety seat in a closed position in accordance with one or more embodiments of the present invention.

A safety seat 10 is mounted in a bulkhead 2 disposed within the fuselage of an airplane and includes a front shell 20, a back shell 30 opposite front shell 20, a pivotable seat base 40 for supporting the infant or small child, a seat back 50 for supporting at least the back of the infant or small child, and an actuator 60 for moves seat back from a substantially, vertical stowed position to an inclined, supporting position and vice versa.

Preferably, safety seat 10 is mounted in a through-opening in bulkhead 2 and, therein, most preferably using an optional rear cover 35 on the rear side of bulkhead 2. However, the present invention may also be mounted in bulkhead 2 using a single opening in the front side of the bulkhead.

It should be understood that the side of bulkhead 2 closest to the infant or small child when seated in safety seat 10 is the front side of bulkhead 2 and the opposite side of bulkhead 2 is the rear side of bulkhead 2. A coordinate system defines plane XY substantially parallel to the bulkhead and plane YZ perpendicular to plane XY.

Seat base 40 cantilevers away from front shell 20 to an open position that defines an open position 12b for safety seat 10 in which an infant or a small child may be placed in safety seat 10. In a closed position 12a of safety seat 10, seat base 40 is also in a closed position and is stored flush with front shell 20.

Front shell 20 and back shell 30, as determined from the outer edges of the respective shells, are spaced apart from each other, to accommodate seat base 40 and seat back 50; front shell 20 and rear cover 35, as determined from the outer edges of the respective units, are spaced apart from each other, by a distance 14. Width 2a of bulkhead 2 is preferably at least distance 14. If distance 14 is greater than width 2a, a portion of bulkhead 2 may be built up with one or more spacers (not shown).

Seat base 40 comprises a longitudinal centerline that when safety seat 10 is closed position 12a defines a longitudinal centerline of safety seat 10.

Openings in other elements of the safety seat 10 to receive one or more connectors or fasteners may be reinforced to maintain structural integrity of any element of safety seat 10, to prevent punch-out, and/or to prevent tearing and/or shear failures.

Safety seat 10 may be made of one or more suitable and durable materials or a combination thereof. These materials may include plastics, metals, fiberglass, a composite material, and the like and be used where most appropriate.

Connectors and/or fasteners are preferably made of one or more metals and/or alloys, or an adhesive that can resist cyclic loading and vibration inherent to conveyances without comprising structural integrity of the connection and/or the elements that are being connected. In particular, connectors and/or fasteners are made of lightweight metal, such as aluminum.

One or more components of the actuator are preferably made of one or more metals and/or alloys for durability and structural integrity. In particular, one or more components of the actuator are made of lightweight metal, such as aluminum. However, one or more components of the actuator are preferably made of one or more non-metallic materials for durability and structural integrity. In particular, one or more components of the actuator are made of lightweight material, such as nylon.

Preferably, one or more of front shell 20, a back shell 30, rear cover 35, a seat base 40, and/or a seat back 50 are made of one or more suitable plastic material, for example, in accordance with one or more embodiments of the present invention, a light weight plastic material with high mechanical stability and/or low thermal expansion.

Therein, one or more of front shell 20, a back shell 30, rear cover 35, a seat base 40, and/or a seat back 50 may be molded, formed of layers, and/or a combination thereof.

Where necessary for structural integrity one or more of front shell 20, a back shell 30, a seat base 40, and/or a seat back 50 comprise a structural grid or shape having raised portions that provide structural integrity by resisting tensile forces, compressive forces, shearing forces, and/or bending moments.

One or more surfaces, especially user-visible surfaces, of front shell 20, a back shell 30, a seat base 40, and a seat back 50 that are may have one or more texturing or a lack of texturing, such as a smooth surface.

A fabric or foam material covers the inner edge of front shell 20 and may extend to back shell 30 to prevent any gaps between the two portions and provide safety and comfort to an infant or small child. Similarly, fabric or foam material covers seat base 40 that is in contact with an infant or small child.

Front Shell

FIG. 2*a* is a perspective rear view of a front shell of the safety seat in accordance with one or more embodiments of the present invention.

FIG. 2*b* is a rear planar view of a front shell of the safety seat in accordance with one or more embodiments of the present invention.

FIG. 2*c* is a side view of a front shell of the safety seat in accordance with one or more embodiments of the present invention.

Front shell 20 may have any suitable shape, but preferably has, in plan view, a general ring shape defined by an outer edge 21, an inner edge 22, and an opening 20*a* defined by inner edge 22. Inner edge 22 conforms with a predetermined peripheral gap to an outer edge of seat base 40*a*.

Outer edge 21 has a general ovoid shape that efficiently conforms to a general shape of an infant or small child when seated in a supporting safety seat. Specifically, a top segment 21*a* is narrower than a bottom segment 21*b* because the head of an infant or small child when seated in seat base 40 is narrower than the hips of the infant or small child when seated. By efficiently conforming to the general shape of an infant or small child when seated in a supporting safety seat, the width of safety seat 10 may be kept at a minimum and more safety seats 10 may be mounted side-by-side in bulkhead 2 to increase efficient use of bulkhead 2.

In cross-section from outer edge 21 to inner edge 22, the ring shape is arched. Specifically, a front side of front shell 20, inner edge 22 is raised from bulkhead 2, but outer edge 21 is directly disposed against bulkhead 2. However, outer edge 21 may be indirectly disposed against bulkhead 2, for example, when one or more spacers are used.

A plurality of openings 23 are provided proximal to outer edge 21 to receive a respective plurality of connectors that connect front shell 20 to bulkhead 2. Preferably, the plurality of openings 23 are disposed both around a perimeter of front shell 20 and proximal to outer edge 21.

The connectors may be any suitable type of connector and are secured into one or more structural elements of bulkhead 2.

A support grid 24 is disposed on a rear side of front shell 20.

In plan view, an extension 26 extends from inner edge 22 into opening 20*a*. A pair of arms 27*a* are formed on the rear side of front shell 20 and disposed under extension 26. Each arm comprises a through-opening 27*b* that has a centerline oriented perpendicularly to a longitudinal centerline of front shell 20. A pair of receivers 28*a* is formed on the rear side of front shell 20. Each receiver comprises a receiver opening 28*b* that has a centerline oriented perpendicularly to a longitudinal centerline of front shell 20 and that is coincident with the centerlines of through openings 27*b*.

A main axle (not shown) is disposed transverse to a longitudinal centerline of safety seat 10 and passes through through-opening 27*b*, ends of the main axle are received by each respective receiver opening 28*b*. A pair of access ports 29 houses respective latches that lock seat base 40 in position and/or lock in position the main axle.

Back Shell

FIG. 3*a* is a perspective rear view of a back shell of the safety seat in accordance with one or more embodiments of the present invention.

FIG. 3*b* is a planar front view of a back shell of the safety seat in accordance with one or more embodiments of the present invention.

FIG. 3*c* is a side view of a back shell of the safety seat in accordance with one or more embodiments of the present invention.

Back shell 30 may have any suitable shape, but, preferably, back shell 30 is an arched shell. Preferably, back shell 30 has, in plan view, a general ovoid shape defined by an outer edge 31*a*.

The general ovoid shape of the back shell 30 preferably matches the general ovoid shape of outer edge 21 of front shell 20.

A peripheral rim 31*b* is preferably planar and is disposed between outer edge 31*a* and a first inner edge 31*c*. A wall portion 32*a* connects first inner edge 31*c* and a second inner edge 32*b*. A structural grid 32*c* comprises raised portions.

Second inner edge 32*b* defines an inner portion 33 that provides structural stability to other components of safety seat 10 are secured. Portion 33 is preferably planar and includes one or more openings 34*a* for securing another component.

Preferably, the general ovoid shape of the back shell 30 is larger in area and/or perimeter than the general ovoid shape of outer edge 21 of front shell 20 for structural stability, specifically to counteract a weight of an infant or a small child on seat base 40. In particular, the general ovoid shape of the back shell 30 is one of 5% larger in area, 5% larger in perimeter, 7.5% larger in area, 7.5% larger in perimeter, 10% larger in area, and/or 10% larger in perimeter than the general ovoid shape of outer edge 21 of front shell 20 for the most advantageous use of materials and structural design. In accordance with one or more embodiments of the present invention the general ovoid shape of back shell 30 is the same in area and/or perimeter as the general ovoid shape of outer edge 21 of front shell 20.

A plurality of openings 34*b* are in disposed in peripheral rim 31*b* to receive a respective plurality of connectors that connect back shell 30 to bulkhead 2 and/or other components of safety seat 10. Preferably, the plurality of openings 34b is disposed at suitable intervals entirely around a perimeter of back shell 30. The connectors may be any suitable type of connector and are secured into one or more structural elements of bulkhead 2 and/or other components of safety seat 10.

Rear Cover

FIG. 4a is a planar rear view of a rear cover of the safety seat in accordance with one or more embodiments of the present invention.

FIG. 4b is a planar front view of a rear cover of the safety seat in accordance with one or more embodiments of the present invention.

FIG. 4c is a side view of a rear cover of the safety seat in accordance with one or more embodiments of the present invention.

Rear cover 35 may have any suitable shape, but, preferably, rear cover 35 is a domed shell. Preferably, rear cover 35 has, in plan view, a general ovoid shape defined by an outer edge 36a.

Preferably, the general ovoid shape of the rear cover 35 is larger in area and/or perimeter than the general ovoid shape of outer edge 21 of front shell 20 for structural stability, specifically to counteract a weight of an infant or a small child on seat base 40. In particular, the general ovoid shape of the rear cover 35 is one of 5% larger in area, 5% larger in perimeter, 7.5% larger in area, 7.5% larger in perimeter, 10% larger in area, and/or 10% larger in perimeter than the general ovoid shape of outer edge 21 of front shell 20 for the most advantageous use of materials and structural design. In accordance with one or more embodiments of the present invention the general ovoid shape of rear cover 35 is the same in area and/or perimeter as the general ovoid shape of outer edge 21 of front shell 20.

Rear cover 35 is mounted to the rear side of bulkhead 2 in order (i) to provide a finished look to the bulkhead and safety seat 10, (ii) to provide structural integrity and rigidity to safety seat 10 and in particular to back shell 30, and/or (3) to provide a through-mounting attachment for back shell 30.

Rear cover 35 comprises a planar peripheral rim 36b that mounts flush against the rear side of bulkhead 2. Peripheral rim 36b is disposed between outer edge 36a and an inner edge 36c defining a transition section 36d of a dome 37 which has a top surface that lies at least partially spaced from a plane in which peripheral rim 36b lies. A structural grid 38 is disposed under dome 37 and peripheral rim 36b and is preferably integrally formed with dome 37 and/or peripheral rim 36b.

A plurality of openings 36e are disposed in peripheral rim 36b to receive a respective plurality of connectors that connect rear cover 35 to bulkhead 2 and/or other components of safety seat 10. Preferably, the plurality of openings 36e is disposed at suitable intervals entirely around a perimeter of rear cover 35. The connectors may be any suitable type of connector and are secured into one or more structural elements of bulkhead 2 and/or other components of safety seat 10.

Seat Base

FIG. 5a is a perspective rear view of a back shell of the safety seat in accordance with one or more embodiments of the present invention.

FIG. 5b is a planar rear view of a back shell of the safety seat in accordance with one or more embodiments of the present invention.

FIG. 5c is a side view of a back shell of the safety seat in accordance with one or more embodiments of the present invention.

Seat base 40 may have any suitable shape, but, preferably, seat base 40 has, in plan view, a generally ovoid shape with a pair of extensions defined by an outer edge 41a. An second edge 41b is disposed at an end of a transition from outer edge 41a. A first side comprises a planar surface 42a defined by outer edge 41a and second edge 41b; the transition between edges 41a and 41b is a non-planar region 42b. Planar surface 42a is disposed flush with inner edge 22 when safety seat 10 is in closed position 12b.

A second side is opposite the first side and comprises an upright wall 43a spaced from outer edge 41a by a lip 43b in the ovoid portion and in a portion 43c between the extensions. Upright wall 43a is flush with outer edge 41a in extension 43d and extension 43e.

The height of upright wall 43a is uniform in the ovoid portion but increases in the extensions 43d, 43e to form abutments 43f on both sides of two pairs of through-openings 44a and 44b for axles. Specifically, the axle disposed through through-opening 27b and into receiver opening 28b also passes through through-openings 44a.

In portion 43c, upright wall 43a has preferably the same height as upright wall 43a has in the ovoid portion.

Upright wall 43a defines an interior surface 47 that is preferably planar. A retainer 45 comprises a rectangular block 45a disposed on a longitudinal centerline 47a of interior surface 47 that is preferably coincident with plane YZ when safety seat 10 is in an open position 12b. An end portion 45b comprises an arcuate portion 45c and an end block 45d, which are retained between the legs of an occupant and serve as an anchorage point for a five point safety belt (not shown).

A pair of openings 46 is formed in the rear side for permitting an extension of latches 29 to reach the main axle disposed through through-opening 27b, receiver opening 28b, and through openings 44a.

Seat Back

FIG. 6a is a rear view of a seat back and a spine mounted to the seat back of the safety seat in accordance with one or more embodiments of the present invention.

FIG. 6b is a front view of a seat back of the safety seat in accordance with one or more embodiments of the present invention.

FIG. 6c is a side view of a seat back and a spine mounted to the seat back of the safety seat in accordance with one or more embodiments of the present invention.

Seat Back 50 may have any suitable shape, but, preferably, seat back 50 has, in plan view, a generally an arcuate top portion 51a and a substantially rectangular lower portion 51b. When safety seat 10 is in closed position 12a, seat back 50 is in a substantially vertical position and when safety seat 10 is in open position 12b seat back 50 is inclined toward back shell 30 such that top portion 51a is displaced more than bottom portion 51b from a vertical position.

A front side 52a faces seat base 40; a rear side 52b is disposed opposite front side 52a and faces back shell 30. An upright wall 53a is disposed on front side 52a and defines a surface 53b of front side 52a. Surface 53b is preferably planar for the safety and comfort of the infant and small child using the safety seat 10. Rear side 52b is formed as a planar surface to which a spine 62 is mounted.

Upright wall 53a forms a periphery of top portion 51a, the sides of lower portion 51b, and a pair of extensions 53c, 53d. Extensions 53c, 53d are disposed at the lower sides of the seat back and are spaced laterally from lower portion 51b by a pair of indents 53e, 53f.

A transition 52g between surface 52a and upright wall 53a is preferably curved for safety and comfort of the infant and small child using the safety seat 10.

Actuator

FIG. 7a is a rear perspective view of a seat base and actuator assembly of the safety seat in accordance with one or more embodiments of the present invention.

FIG. 7b is a side view of a seat base and actuator assembly of the safety seat in accordance with one or more embodiments of the present invention.

FIG. 7c is a top view of a seat base and actuator assembly the seat back of the safety seat in accordance with one or more embodiments of the present invention.

Actuator 60 moves seat back 50 from a substantially, vertical stowed position to an inclined, supporting position responsive to the seat base 40 being moved from a closed position 12a to an open position 12b.

FIG. 8a is a perspective view of a spine mounted to a seat back of the safety seat in accordance with one or more embodiments of the present invention.

FIG. 8b is a top view of a spine mounted to a seat back of the safety seat in accordance with one or more embodiments of the present invention.

Actuator 60 includes a spine 62 that is mounted to rear side 52b of the seat back preferably using fasteners Spine 62 may comprise any suitable shape, but preferably comprises a T-shape wherein a upstanding portion 62a extends away from rear side 52b. A first through-opening 62b is disposed on an extension 63a proximal to a first end of portion 62a and receives an anchor hinge 64. A second opening 62c is disposed on an extension 63b proximal to a second end of portion 62a and is received by a control arm 70.

FIG. 9a is a perspective view of an anchor hinge of the safety seat in accordance with one or more embodiments of the present invention.

FIG. 9b is a side view of an anchor hinge of the safety seat in accordance with one or more embodiments of the present invention.

Anchor hinge 64 may be any usable component that rotatably connects anchor hinge 64 to spine 62 but fixedly joins anchor hinge 64 to back shell 30 using a plurality of fasteners passing through one or more openings 64d in the base plate. Therein, back shell 64 is fixed joined to backs shell 30. For example, anchor hinge 64 may comprise a base plate 64a and a one or more arms 64b are joined perpendicularly to base plate 64a to form a yoke. Each arm 64b comprises a through-opening 64c. An axle is disposed through through-opening 64c and through-opening 62b of spine 62 to permit rotation of anchor hinge 64 relative to spine 62.

FIG. 10a is a front view of a slide of the safety seat in accordance with one or more embodiments of the present invention.

FIG. 10b is a top view (at an exaggerated scale relative to FIG. 10a) of a slide of the safety seat in accordance with one or more embodiments of the present invention.

A slide 66 may be any usable component that is fixedly joined to back shell 30 and permits movement of a carriage 68 relative to slide 66 while movably retaining carriage 68 proximate to slide 66 in a retention and guide assembly 66a. Assembly 66a may have any suitable shape or form. For example, retention and guide assembly 66a comprises a rail 66b disposed on a longitudinal centerline of slide 66 and a pair of C-shaped retainers 66c disposed at the longitudinal edges of slide 66. Rail 66b is formed as a raised rail, may be formed a depressed rail in which a show 67 slides. Preferably, slide 66 is fixedly joined to back shell 30 using connectors passing through one or more openings 66d and into openings 34a.

FIG. 10c is a perspective view of a shoe of the safety seat in accordance with one or more embodiments of the present invention.

FIG. 10d is a top view of a shoe of the safety seat in accordance with one or more embodiments of the present invention.

One or more shoed 67 are disposed in slide 66 to move in the slide and carry carriage 68. Shoe 67 may be made of any suitable material but preferably is made of a silicon or nylon material that through use case lubrication of the slide, i.e., one or more shoes 67 are self-lubricating, for reduced maintenance. Each shoe comprises a main body 67a having widened ends 67b that are disposed to be received in C-shaped retainers 66c. The base body further includes a channel 67c that fits rail 66b to move along rail 66b. A planar base 67d and openings 67e are provided to mount carriage 68 flush with each shoe.

FIG. 11a is a perspective view of a carriage of the safety seat in accordance with one or more embodiments of the present invention.

FIG. 11b is a rear view of a carriage of the safety seat in accordance with one or more embodiments of the present invention.

FIG. 11c is a side view of a carriage of the safety seat in accordance with one or more embodiments of the present invention.

Carriage 68 may be any usable component that moves longitudinally relative to slide 66 and that is retained proximal to slide 66 by one or more shoes 67. Carriage 68 comprises a main body 68a and a yoke 68b. Each arm of yoke 68b has a support block 68c and a through-opening 68d disposed in support block 68c. One side of through-opening 68d is enlarged relative to the other side and receives in the enlargement a bushing 69. Preferably, bushing 69 is a roller-bearing bushing to permit smooth operation.

The centerline of yoke 68b is preferably located at a longitudinal centerline of carriage 68 and is geometrically connected to a recess 68e in the main body.

FIG. 12a is a perspective view of a control arm of the safety seat in accordance with one or more embodiments of the present invention.

FIG. 12b is a rear view of a control arm of the safety seat in accordance with one or more embodiments of the present invention.

Control arm 70 may be any usable component that is rotatably connected to carriage 68 to rotate while carriage 68 itself moves in slide 66 and is rotatably connected to spine 62. Control arm 70 comprises a main body 70a having a lower receiver 70b for receiving a link 72 and an upper receiver 70c for receiving extension plate 63b.

A through-opening 70d is disposed proximal to a first end of control arm 70. One side of through-opening 70d is enlarged relative to the other side and receives in the enlargement a bushing 69. Preferably, bushing 69 is a roller-bearing bushing to permit smooth operation. An axle is disposed through through-opening 70d and through one or both through-openings 68d of carriage 68 to permit rotation of control arm 70 relative to carriage 68 and vice versa.

A through-opening 70e is disposed proximal to a bridge 70f of control arm 70. Through-opening 70e is disposed between a first end and a second end of the main body of the control arm, preferably at a mid-point of control arm 70 where one or more links 72 are rotatably joined to control arm 70.

A pair of through-openings 70g is disposed proximal to a second end of control arm 70. An axle is disposed through one or both through-openings 70g and through-opening 62b of spine 62 to permit rotation of control arm 70 relative to spine 62.

FIG. 13a is a side view of a link of the safety seat in accordance with one or more embodiments of the present invention.

FIG. 13b is a front view of a link of the safety seat in accordance with one or more embodiments of the present invention.

A plurality of links 72 may be any usable components that act as followers for seat base 40 and permits movement of control arm 70 relative to seat base 40. Each link 72 may be any useable shape but preferably comprises a main body 72a having an arcuate shape, preferably having a 5-10 degree of curvature.

In each link 72, a first opening 72b is disposed at a first end of link 72. An axle is disposed through one or both through-openings 72b of a pair of links 72 and through-opening 70e of control arm 70 to permit movement of control arm 70 relative to links 72.

A second opening 72b is disposed at a second end of link 72. An axle is disposed through one or both through-openings 72b of a pair of links 72 and through-opening 44a of seat base to permit movement of each link 72 relative to seat base 40.

Initiator System

FIG. 14a is a planar view of an initiator of the safety seat in accordance with one or more embodiments of the present invention.

FIG. 14b is a perspective view of an initiator of the safety seat in accordance with one or more embodiments of the present invention.

An initiator system comprises one or more initiators 74 disposed operationally proximal to the spine at enlarged area 63a and at the slide. Initiator 74 responsive to a movement in a cable 75a to release a spring-biased pin 75b that maintains safety seat locked in either positions 12 or 12b. Once released, movement of one or more components of safety seat 10 is possible. Movement may be initiated by a user using a switch 76 disposed in opening 29 of the front shell.

Operation and Installation

When safety seat 10 is in closed position 12a, safety seat 10 is unobtrusive to an air carrier. When a user wishes to use safety seat 10, one or both latches 76 are engaged to unlock seat base to move seat base 40 from closed position 12a to open position 12b. The initiator system causes a release of one or more pins 76 and seat base 40 to move from closed position 12a to open position 12b by pivoting the seat base relative to the front shell forward into the aircraft cabin.

Therein, as seat base 40 rotates on the main axle to open position 12b, one or more links 72 causes control arm 70 simultaneously to rotate relative to carriage 68 and spine 62. Carriage 68 moves away from a stowed position 100a along the Y axis upwards along slide 66 and spine 62 rotates with seat back 40 along the Z axis relative to the XY plane causing seat back 40 to be inclined for comfort of the infant or small child. Closing safety seat 10 is the reverse operation of opening the safety seat.

Preferably, safety seat 10 will be equipped with one or more cushion or foam covers and include a seat belt.

To make installation easy, all components of safety seat 10 except rear cover 35 are unitized, i.e., joined operationally together, into one installation package that can be mounted into bulkhead 2. One series of fasteners is used to secure the rear cover, shell back and front shell together preferably through one or more structural elements of bulkhead 2.

Although the invention has been explained in relation to its preferred embodiments, it is to be understood that many other possible modifications and variations may be made without departing from the spirit and scope of the invention.

What is claimed is:

1. A safety seat for an occupant, the safety seat comprising: a front shell secured to a bulkhead, the front shell having an outer edge and an inner edge, the inner edge defining an opening; a seat base having a first side and a second side opposite the first side, the seat base having a first position and a second position; the occupant when the seat back is in an inclined position; an actuator for moving the seat back from a substantially vertical position to the inclined position, the actuator comprising a control arm, the control arm comprising a through-opening between a first end and a second end of the control arm, the first end being operationally attached to the seat back, wherein in the first position, the first side is flush with the inner edge; wherein in the second position, the second side supports the occupant, wherein the actuator comprises a link, the link being rotatably attached to the control arm to pivot the seat back forward to incline the seat back while the seat base rotates relative to the front shell from the first position to the second position.

2. The safety seat of claim 1,
further comprising a transverse axle being supported by the front shell;
wherein the seat base is rotatable on the transverse axle relative to the front shell.

3. The safety seat of claim 1, wherein the seat base comprises a base portion for securing a five-point safety belt.

4. The safety seat of claim 1,
further comprising a spine secured to the seat back, the spine being pivotably connected to the first end.

5. The safety seat of claim 1, wherein the link is curved and the control arm comprises a receiver for receiving the link.

6. A safety seat for an occupant, the safety seat comprising:
a front shell secured to a bulkhead, the front shell having an outer edge and an inner edge, the inner edge defining an opening;
a seat base having a first side and a second side opposite the first side, the seat base having a first position and a second position;
a seat back for supporting a back of the occupant;
an actuator for moving the seat back from a substantially vertical position to an inclined position;
wherein in the first position, the first side is flush with the inner edge;
wherein in the second position, the second side supports the occupant;
wherein the actuator comprises a link and a control arm, the control arm comprising a through-opening between a first end and a second end of the control arm, the first end being operationally attached to the seat back,
the link being rotatably attached to the control arm to pivot the seat back forward while the seat base rotates relative to the front shell from the first position to the second position.

7. The safety seat of claim 6,
wherein the link is curved.

8. The safety seat of claim 6, wherein the second end is pivotably attached to carriage movable relative to the front shell and the seat base.

9. The safety seat of claim 8, further comprising a back shell substantially parallel to the front shell, wherein the carriage slides relative to the back shell.

10. The safety seat of claim 6, wherein the control arm comprises a receiver for receiving the link.

11. A safety seat for an occupant, the safety seat comprising:
- a front shell secured to a bulkhead, the front shell having an outer edge and an inner edge, the inner edge defining an opening;
- a back shell secured to the bulkhead and an actuator for moving a seat base to the second position;
- a seat base having a first side and a second side opposite the first side, the seat base having a first position and a second position;
- wherein in the first position, the first side is flush with the inner edge;
- wherein in the second position, the second side supports the occupant;
- wherein the actuator comprises a slide mounted on the back shell and a carriage movable relative to the slide.

12. The safety seat of claim 11, wherein the actuator comprises an actuator arm and a link assembly, the actuator arm being connected to the carriage and to a seat back, the link being connected to the arm control and the seat base.

13. The safety seat of claim 12, wherein the link is pivotably connected to the seat base at a point spaced away from an axis of rotation of the seat base, the axis of rotation for rotating the seat base from the first position to the second position.

14. The safety seat of claim 11, wherein the carriage is disposed on a self-lubricating shoe sliding in the slide.

15. A safety seat for an occupant, the safety seat comprising:
- a seat back;
- a seat base stowed in a first position unusable to the occupant and operational in a second position, the seat base for pivoting about a first axis of rotation;
- a link pivoting about a second axis of rotation, the first axis of rotation and the second axis of rotation being spaced apart; and
- a control arm connected to the link and movable relative to the link;
- wherein the control arm comprises a receiver for receiving the link;
- wherein the control arm moves the seat back to an inclined position when the seat base is pivoted in the second position.

16. The safety seat of claim 15, wherein the link is curved.

17. The safety seat of claim 15, wherein the control arm is pivotably attached to a carriage movable relative to the seat base.

18. The safety seat of claim 17, further comprising a back shell substantially parallel to the seat base when in the stowed position, wherein the slide slides relative to the back shell.

19. The safety seat of claim 15,
- wherein the control arm comprising a through-opening between a first end and a second end of the control arm, the first end being operationally attached to the seat back,
- wherein the link is rotatably attached to the control arm to pivot the seat back forward while the seat base rotates relative to the front shell from the first position to the second position.

* * * * *